No. 817,361. PATENTED APR. 10, 1906.
R. H. BROWN & J. HIRSCH.
SAW.
APPLICATION FILED JULY 25, 1905.
2 SHEETS—SHEET 1.
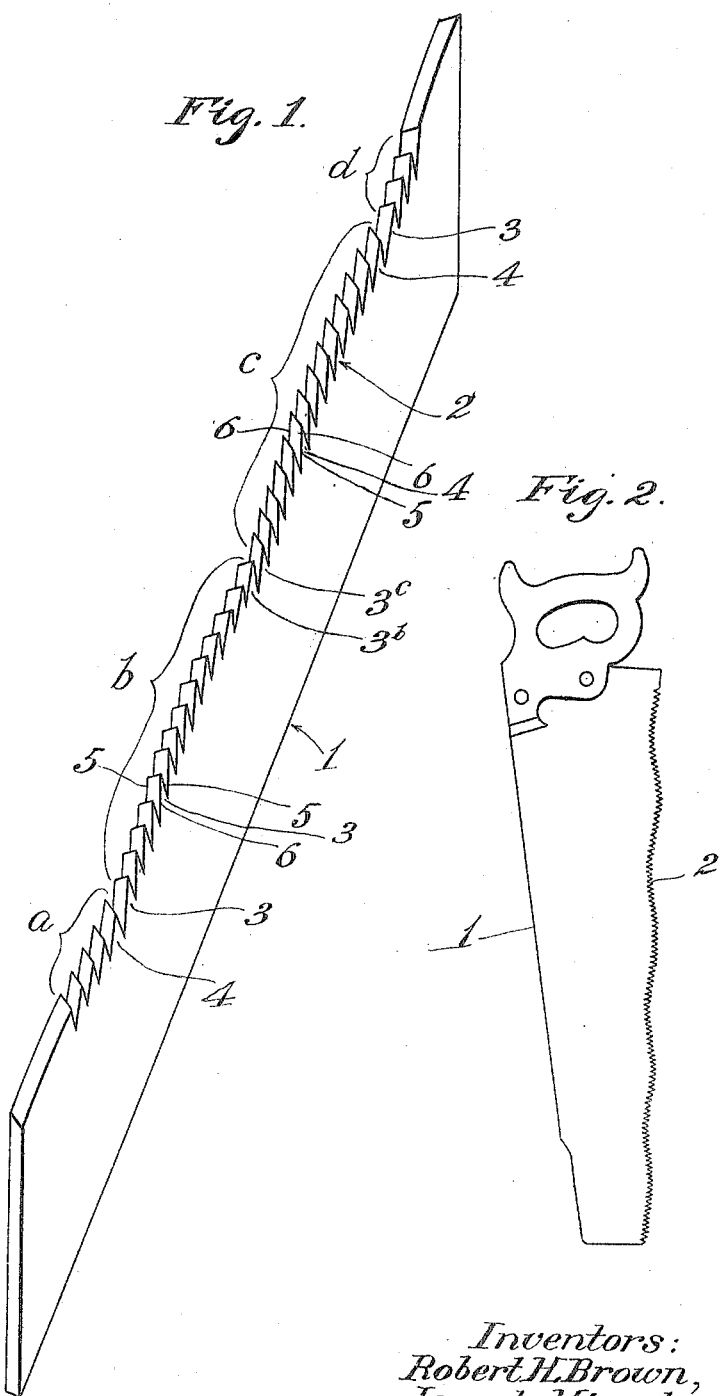
Witnesses:
C. C. Holly.
J. Townsend.
Inventors:
Robert H. Brown,
Joseph Hirsch,
by James R. Townsend
atty No. 817,361. PATENTED APR. 10, 1906.
R. H. BROWN & J. HIRSCH.
SAW.
APPLICATION FILED JULY 25, 1905.
2 SHEETS—SHEET 2.
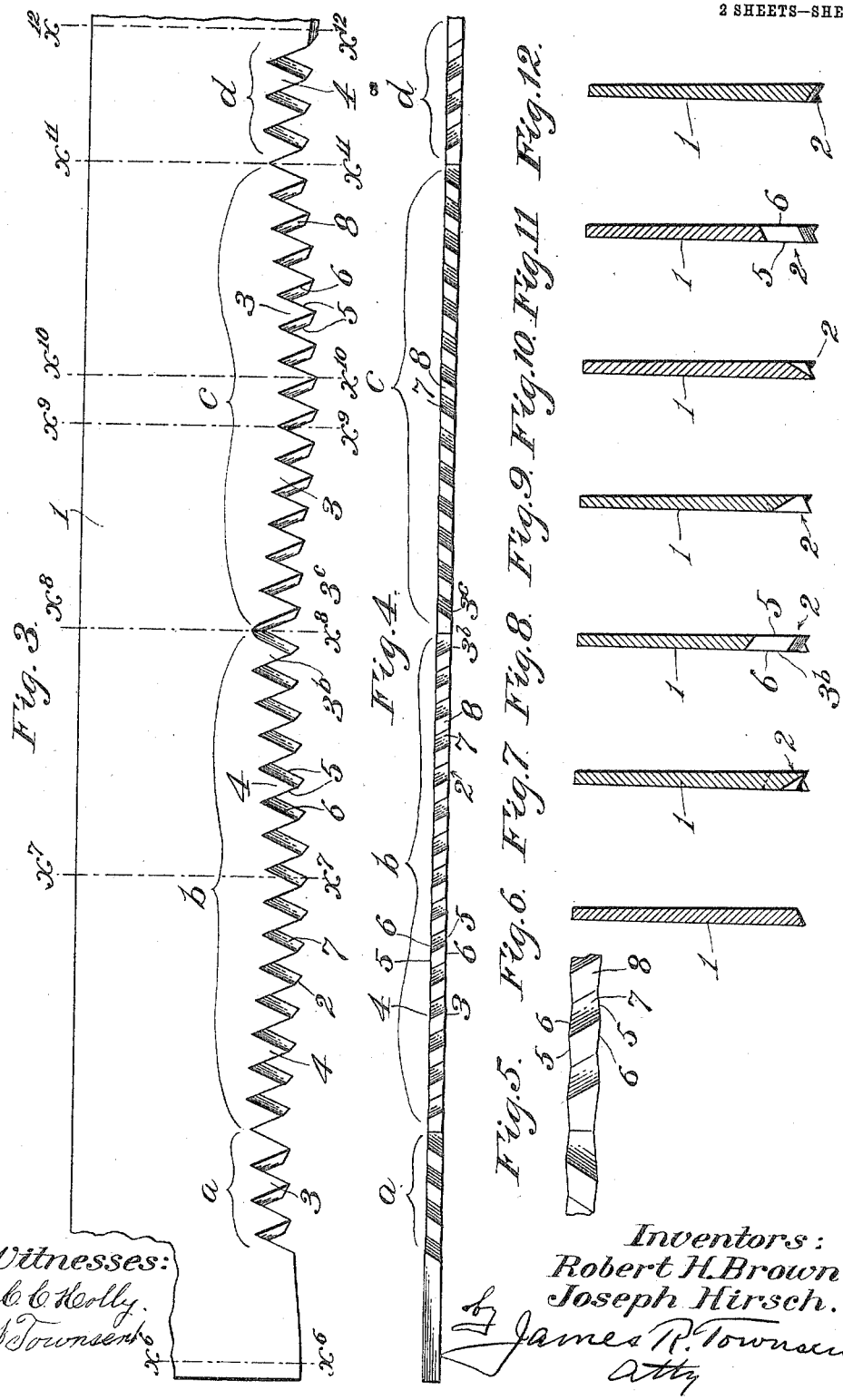
Witnesses:
C. C. Holly.
J. Townsend
Inventors:
Robert H. Brown,
Joseph Hirsch.
by James R. Townsend
Atty

UNITED STATES PATENT OFFICE.

ROBERT H. BROWN AND JOSEPH HIRSCH, OF LOS ANGELES, CALIFORNIA.

SAW.

No. 817,361.  Specification of Letters Patent.  Patented April 10, 1906.

Application filed July 25, 1905. Serial No. 271,146.

*To all whom it may concern:*

Be it known that we, ROBERT H. BROWN and JOSEPH HIRSCH, citizens of the United States, residing at Los Angeles, in the county of Los Angeles and State of California, have invented a new and useful Improvement in Saws, of which the following is a specification.

This invention is applicable to saws in general, and particularly to handsaws.

An important object of the invention is to provide an improved saw which will be efficient as a crosscut and as a rip saw and that will cut efficiently in both directions of movement.

A further object of the invention is to provide a saw that will give a superior smooth or "finish" cut.

Another object of the invention is to provide a saw wherein the sharpening and setting can be effected more quickly and easily than with the usual form of saw.

Another object of the invention is to provide a saw which will without setting continually tend to free itself and avoid clogging or binding in the wood.

A further object of the invention is to provide a saw wherein the cutting-teeth will act substantially in the manner of chisels to cut out the wood in place of gouging or tearing it out, as is the case with the ordinary saws.

The invention comprises a saw having its teeth all adapted to act both as clearing and cutting teeth and arranged in a sinuous or undulating manner forming sections, each section having the teeth at its middle portion projecting farther than the teeth at its ends and the teeth of the alternate sections being sharpened and formed in such manner that the sections will come alternately into operation, each section acting substantially as a unit.

The accompanying drawings illustrate the invention.

Figure 1 is a perspective view of a saw-blade embodying the invention. Fig. 2 is a side view of a handsaw embodying the invention. Fig. 3 is a side elevation of the blade shown in Fig. 1, portions thereof being broken away to contract the view. Fig. 4 is an edgewise elevation of Fig. 3. Fig. 5 is an enlarged exaggerated fragment of Fig. 4. Figs. 6, 7, 8, 9, 10, 11, and 12 are sectional views taken, respectively, on lines $x^6$ $x^7$ $x^8$ $x^9$ $x^{10}$ $x^{11}$ $x^{12}$ of Fig. 3 looking from the right toward the left.

1 designates a saw-blade provided with teeth 2, which are formed along the cutting edge of the saw in a sinuous or forwardly and rearwardly curved line—that is, alternately concaved and convexed—so that the teeth at the crest of the convex portions of the curves project in a direction edgewise of the saw-blade farther than the teeth at the base of the concave portions. The teeth 2 are arranged in sections $a$, $b$, $c$, and $d$, each section extending from the base of one concave portion of the saw edge to the base of the next concave portion thereof. In Figs. 1 and 3 two of such sections $b$ and $c$ are shown, together with parts of two other sections $a$ and $d$. The teeth are single-pointed and triangular, with their width preferably about two-thirds their length. Each section has all of its teeth alike in shape and size and similarly sharpened. The teeth of each section are also disposed alike, with their points all projecting farthest on the same side. In the drawings the teeth are shown as having no set in the sense of being inclined sidewise—a feature which will be more fully explained hereinafter.

As shown in Figs. 1 and 3, every tooth is sharpened so as to cut deepest into one side of the kerf, the apex of the tooth sloping so as to throw the point to one side, which may be called the "pointed" side of the tooth. Each side of every tooth has a triangular surface 3 or 4, one edge 5 of which terminates in a sharp cutting and clearing edge, while the other edge 6 terminates in an obtuse angle or edge not intended to perform any cutting function. The cutting edge 5 on one side of every tooth is diagonally opposite the cutting edge 6 on the other side of the tooth and adjacent to the obtuse edge on the other side of the tooth. Therefore every tooth acts as a surfacing-tool to widen the kerf and smooth off one side or the other of the kerf, according to the direction the blade is being drawn.

As already stated, all the teeth in a section are alike; but the teeth of adjacent sections are reversely disposed—that is, the points of the teeth in one section project from one side of the blade and the points of the teeth in an adjacent portion project from the other side of the blade. Both faces of the same tooth, as well as the opposing faces 7 8 of adjacent teeth throughout each series *a b*, &c., are parallel transversely of the saw, as is clearly shown in Figs. 4 and 5. This makes it possible to sharpen all the teeth of each section by reciprocating the file in the same direction—that is to say, if in each section *a b c* lines be drawn across oppositely-disposed faces 7 8 of adjacent teeth at the same distance outwardly from the body of the blade and in a plane extending lengthwise of the blade at right angles to the side thereof said lines will be parallel. Therefore if a file is used which properly fits the spaces between the teeth the sharpening can be effected much more quickly than the sharpening of the ordinary saw.

$3^b$ and $3^c$ designate the teeth at the middle of the blade at the ends of two adjacent sections. The adjacent faces of these teeth must be sharpened separately or else a different-shaped file be used to fit between them, as is also the case with the teeth between the other sections. The pressure of the file against the teeth will in itself produce a setting or deflection of the tooth to one side, which may be sufficient for the work required of the saw, or in some cases may be even more than is desired. If additional set, however, is required, it can be obtained by simply bending over the teeth a section at a time by means of a suitable instrument or clamp, or, if desired, all the similar sections can be bent simultaneously by proper manipulation, it being understood that alternate sections will be reversely set in correspondence with the reverse filing thereof. If the set obtained by filing or by subsequent setting, as above described, is excessive, it may be reduced by laying the saw on a support and pressing a flat surface against the same. In practice it has ordinarily not been found necessary to use a setting-tool. One reason for this advantage appears to be that the teeth of each section all tend to chisel into the same side of the kerf, and therefore tend to spring out laterally the portion of blade occupied by a section of teeth, and thereby make a wider kerf. This function is performed better on account of the reversely-pointed series of teeth each being made to occupy a convex portion of the blade, said convex portions being better adapted to spring out laterally than equal lengths of the edge of a straight blade. The saw-blade should be made tapering considerably away from the cutting edge to assist in overcoming the danger of pinching. Fig. 5 shows to an exaggerated degree the effect of the taper in making the teeth broader at their apexes than at their bases. The rearward taper of the blade also makes the teeth narrower as they approach the bases of the concave portions of the saw's edge, and thereby gives additional freedom from pinching.

In filing the teeth the file is held at a similar angle in working between successive teeth throughout each section, so that each tooth has its two faces inclined in the same transverse direction.

In consequence of the cutting-points of all the teeth of each section being arranged in a continuous series on the same side of the blade each section is provided with a narrow cutting edge, adapting the saw to be started into the wood conveniently and accurately.

On drawing the saw back and forth each tooth will act as a sharp-pointed chisel, slicing or cutting its way into the wood. As each section passes through the wood the teeth on the advance or rising side thereof will continually tend to cut deeper into the wood, giving a progressive or gradual cutting action, and then as the crest of the section is passed and the teeth which are brought into action are less projecting the saw will tend to free itself, enabling the next section to come into action with greater facility and without any tendency to bind or clog. The saw has therefore an intermittent alternate biting and clearing action. It will be seen that this action will be the same in both directions of movement of the saw, and the saw is therefore effective on both thrusting and pulling strokes and with a minimum pressure. The saw is also found to work equally well as a rip-saw or as a crosscut-saw, the shape of the teeth enabling it to cut its way through crosswise of the wood and also enabling it to cut lengthwise into the wood by a slicing action which is more efficient than the usual gouging action of rip-saw. Owing to the chiseling effect of the teeth and to the progressive action of the teeth of each section, the saw gives a smooth cut which does not require a planing finish, even for fine work.

It will be seen that each tooth forms a chisel having diagonally opposite cutting edges, one on each side of the blade, one edge acting only as a surfacing or clearing edge, the other acting both as a surfacing-tool and a cutting edge for deepening the kerf. Hence each section *a b*, &c., comprises a continuous series of contiguous teeth, all the teeth of each section having diagonally opposite surfacing edges, all the forward surfacing edges of the teeth in a series being adapted to surface one side of the kerf when the saw is moved forwardly and all the rearward surfacing edges of the teeth in the same series adapted to surface the other side of the kerf when the saw is moved rearwardly, the teeth of each series having their points sloped to deepen one side of the kerf only, while the teeth of an adjacent series have all their points sloped to deepen the other side of the kerf.

In practice it has been found that in order to provide the most efficient cutting edge when the bases of the concave portions are four inches apart the highest teeth should project one-eighth of an inch farther than the lowest teeth, and when the teeth are arranged in longer or shorter undulations the difference in the extent which the teeth project should be varied accordingly.

The saw above described can be advantageously used in places where it would be difficult to use an ordinary saw, the double action of the saw or capacity for action in both forward and backward strokes enabling it to be used in places, such as ceiling-work, where a downward pull is much easier than an upward thrust.

In manufacturing the saw alternate sections may be pressed out at a time, the blade being held obliquely to the downward movement of the die. Then the blade may be reversed and the intervening sections likewise pressed out. This method of manufacture makes but little filing necessary in order to prepare the finished product for use.

What we claim is—

1. In a reciprocatory handsaw, a series of teeth having faces sloping equally to the apex, both the faces of the same tooth being parallel transversely of the saw-blade and the opposing faces of adjacent teeth throughout said series, also being parallel transversely of the saw, the teeth of said series terminating in diagonally opposite surfacing edges.

2. A saw provided with a convex section furnished with a series of contiguous teeth, all of the teeth of said series being provided with diagonally opposite surfacing edges, said teeth all being adapted to surface one and the same side of the kerf when the saw is moved forwardly, the rearward surfacing edges of said teeth adapted to surface the other side only of the kerf when the saw is moved rearwardly; and an adjacent convex section alike in all respects to the first-named section except that at each movement of the saw the teeth of the last-named section surface the side of the kerf opposite to that being surfaced by the first-named section.

3. In a reciprocatory handsaw, a continuous series of teeth, sloping equally to the apex, the teeth of said series provided with diagonally opposite surfacing edges, the forward surfacing edges of all the teeth in said series adapted to surface one side of the kerf when the saw is moved forwardly, and the rearward surfacing edges of the teeth in said series adapted to surface the other side of the kerf when the saw is moved rearwardly.

4. In a saw having an alternately concaved and convexed edge, the combination of a continuous series of teeth occupying the convex portion of an undulation, said teeth having their cutting-faces sloped to cut into one side only of the kerf, with a series of teeth occupying an adjacent convex portion of the saw edge, said last-named teeth having their cutting-faces sloped to cut into the other side of said kerf only.

5. A saw provided with a cutting edge divided into convex sections each made up solely of teeth having their cutting-faces sloping toward only one side of the saw, the teeth of alternate sections having reversely-sloped cutting-faces.

6. A saw provided with a cutting edge divided into sections, the teeth of alternate sections having reversed surfacing edges, whereby each section surfaces one side of the kerf when the saw is moved forwardly and the other side of the kerf when the saw is moved rearwardly, adjacent sections surfacing opposite sides of the kerf at each movement of the saw.

7. A saw provided with a cutting edge divided into convex sections, the teeth of alternate sections having reversed surfacing edges whereby each section surfaces one side of the kerf when the saw is moved forwardly and the other side of the kerf when the saw is moved rearwardly, adjacent sections surfacing opposite sides of the kerf at each movement of the saw.

8. A saw provided with teeth having diagonally opposite chisel-shaped cutting edges one on each side of the blade, one of said edges acting only as a surfacing or clearing edge, the other acting both as a surfacing-tool and a cutting edge for deepening the kerf, all of the teeth of each section having diagonally opposite surfacing edges, all the forward surfacing edges of the teeth in a series being adapted to surface one side of the kerf when the saw is moved forwardly, and all the rearward surfacing edges of the teeth in the same series adapted to surface the other side of the kerf when the saw is moved rearwardly, the teeth of each series having their points sloped to deepen one side of the kerf only, and the teeth of an adjacent series having all their points sloped to deepen the other side of the kerf.

In testimony whereof we have hereunto set our hands, at Los Angeles, California, this 18th day of July, 1905.

ROBERT H. BROWN.
JOSEPH HIRSCH.

In presence of—
ALBERT H. MERRILL,
JAMES R. TOWNSEND.